United States Patent [19]
Wilcox

[11] Patent Number: 6,050,531
[45] Date of Patent: Apr. 18, 2000

[54] INTERNAL TELESCOPIC TUBE LOCKING DEVICE

[76] Inventor: James F. Wilcox, 1975 N. Hwy. 89, Jackson, Wyo. 83001

[21] Appl. No.: 09/264,123

[22] Filed: Mar. 8, 1999

Related U.S. Application Data

[63] Continuation-in-part of application No. 08/910,835, Aug. 13, 1997, abandoned.

[51] Int. Cl.[7] .................................................. F16M 11/26
[52] U.S. Cl. ....................................... 248/188.5; 248/412
[58] Field of Search ............................... 248/188.5, 411, 248/412, 414; 403/105

[56] References Cited

U.S. PATENT DOCUMENTS

| | | | |
|---|---|---|---|
| 1,447,519 | 3/1923 | Schade | 403/105 |
| 4,761,092 | 8/1988 | Nakatani | 403/104 |
| 5,503,357 | 4/1996 | Johnson et al. | 248/188.5 |
| 5,522,300 | 6/1996 | Cheatwood | 84/453 |
| 5,570,968 | 11/1996 | Sassmannshausen et al. | 403/109.3 |
| 5,740,998 | 4/1998 | Lindsay et al. | 248/407 |

Primary Examiner—Anita M. King
Assistant Examiner—David Heisey
Attorney, Agent, or Firm—Hopkins Roden Crockertt Hansen & Hoopes, PLLC

[57] ABSTRACT

A locking device for multiple section telescope tubes that locks the telescoping tubes in any position of extension and releases the leg sections sequentially from the bottom up by depressing a push rod. The push rod releases a pin or ball that clamps the internal surface of an outer leg to the surface of an inner leg, thereby preventing an inner leg from sliding within the outer leg. The device can be used on any telescoping device. For example, the locking device may be used with tripods for cameras, painter's easels, telescopes, and other optical instruments, as a single multi-section stand for music, microphones, light stands, canes, walking sticks, flagpoles, umbrellas, handles, tent poles, or for devices such as radio antennae or pointing devices.

12 Claims, 9 Drawing Sheets

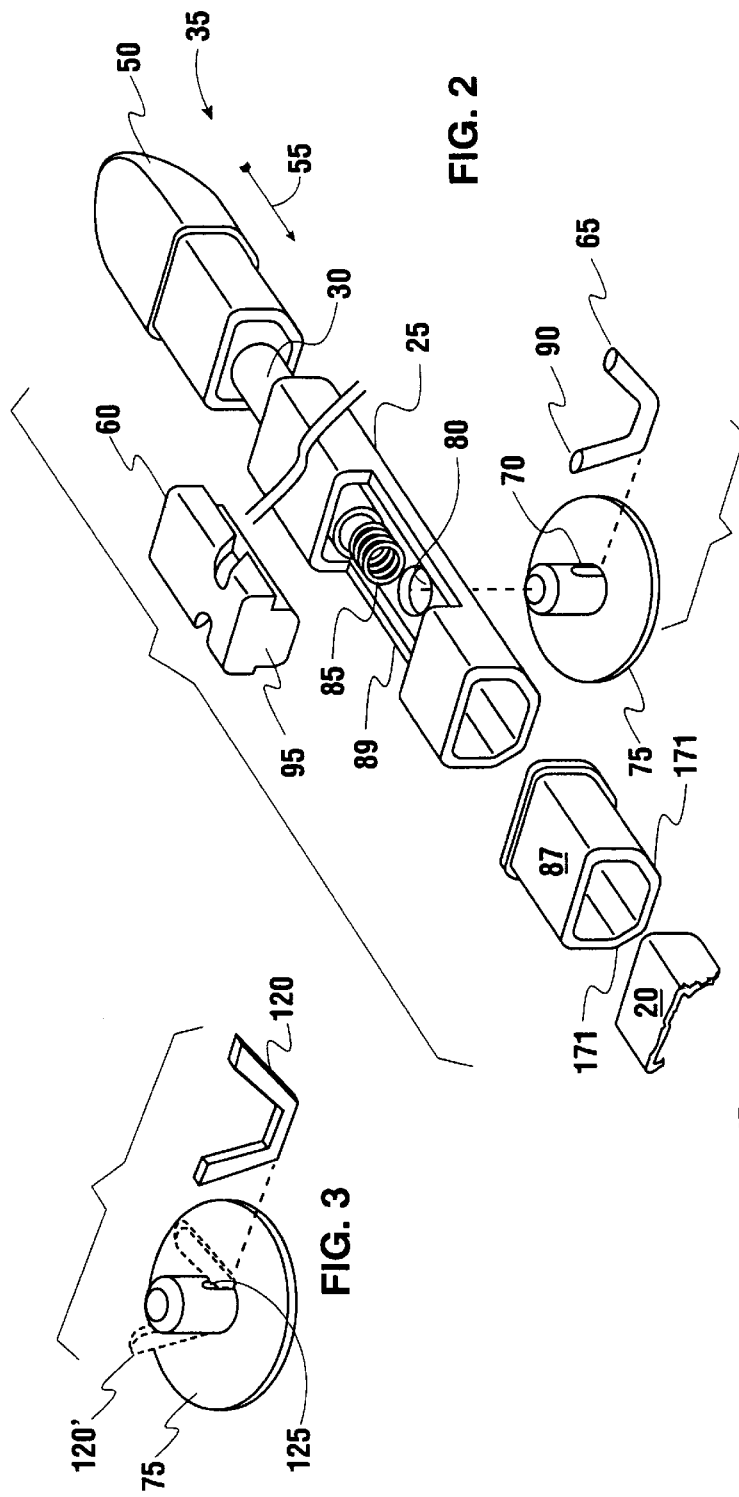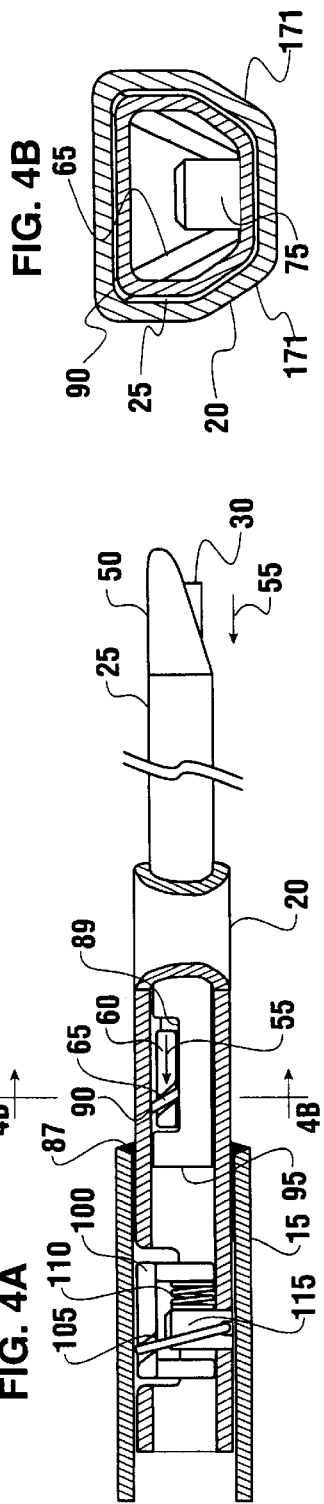

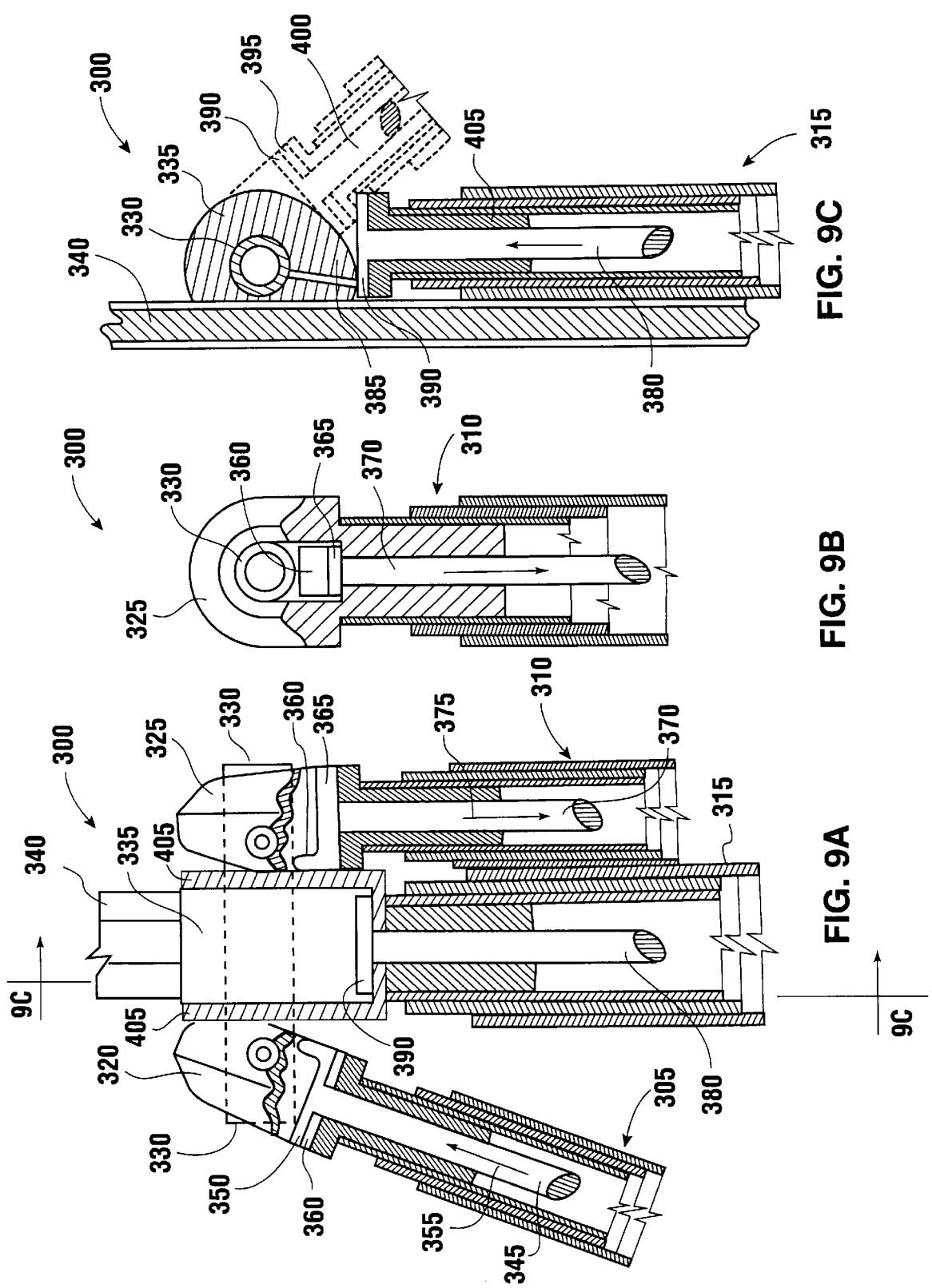

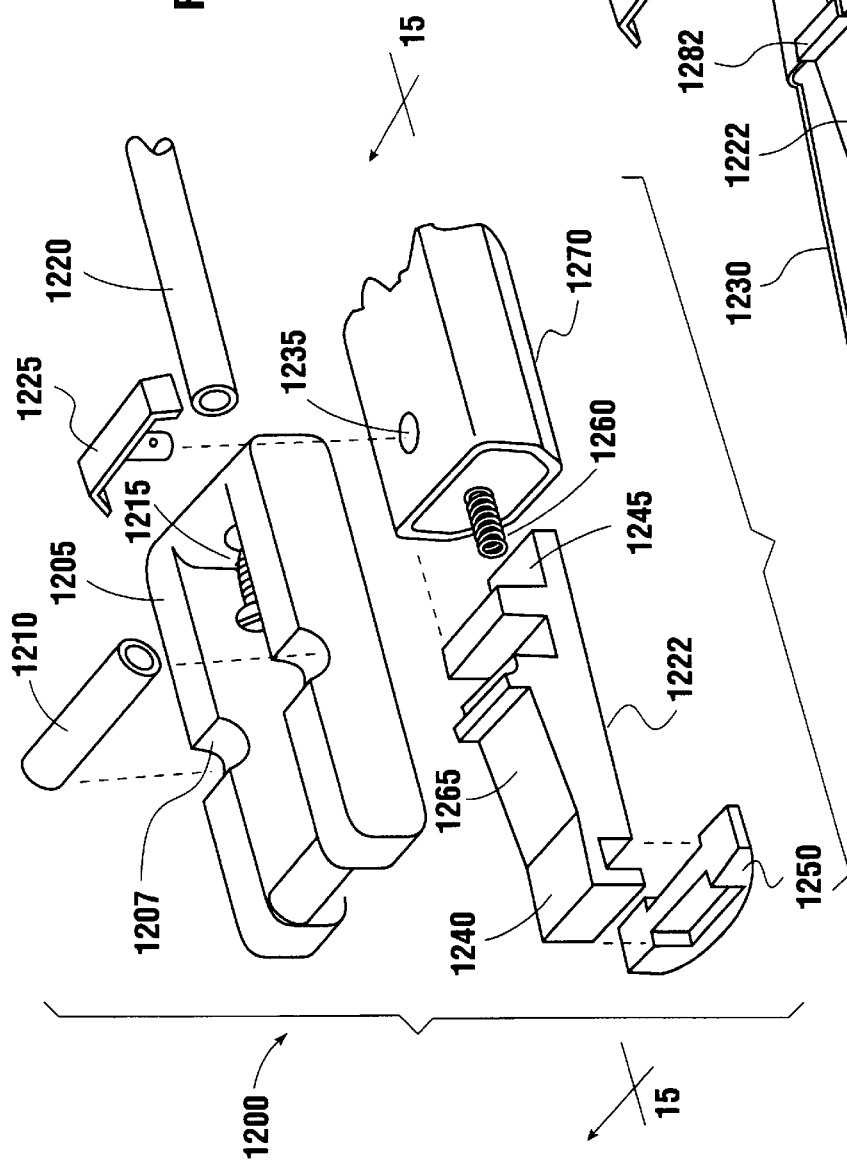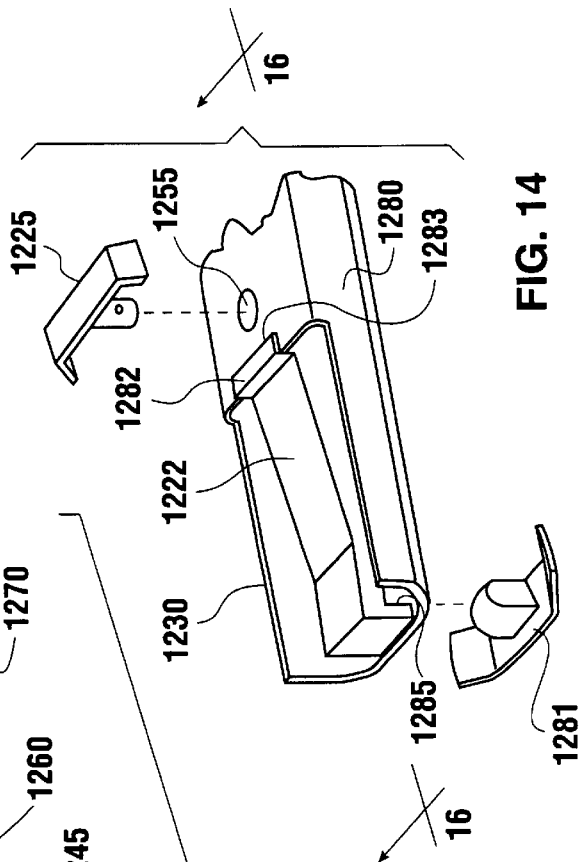

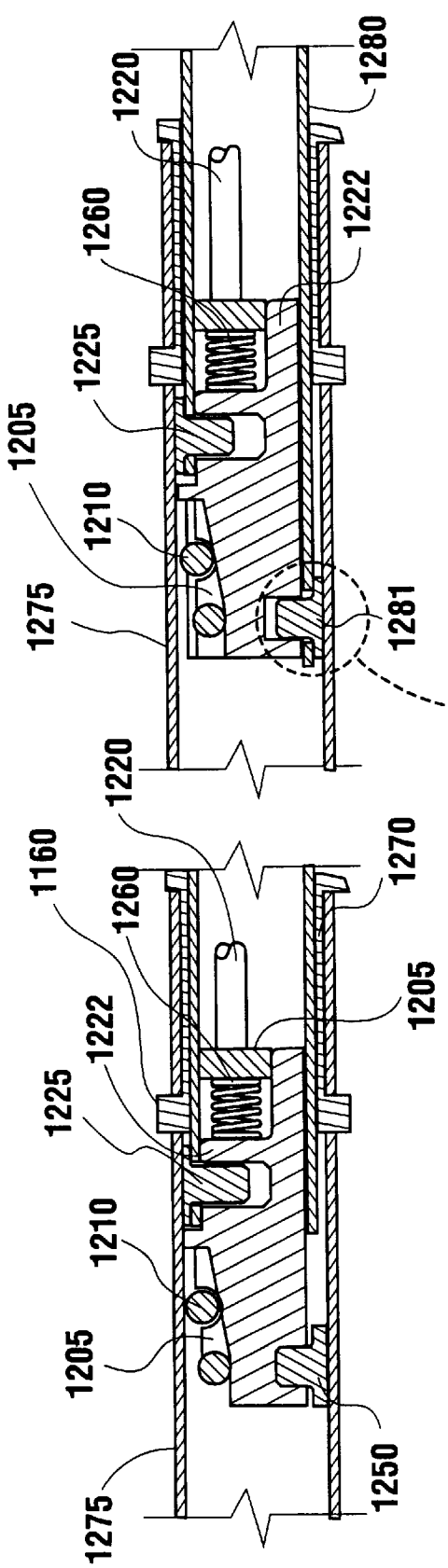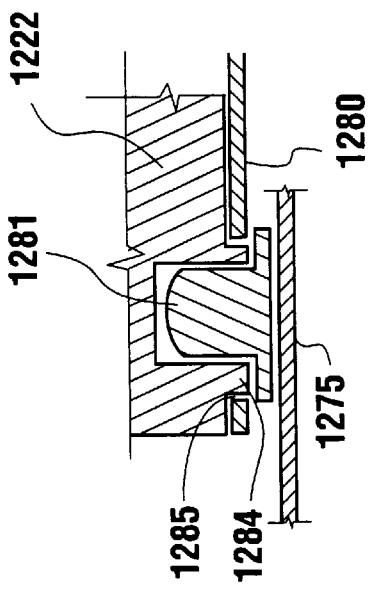

INTERNAL TELESCOPIC TUBE LOCKING DEVICE

This application is a Continuation-In-Part of application Ser. No. 08/910,835, filed Aug. 13, 1997, which is now abandoned.

TECHNICAL FIELD

The invention relates, in general, to an expandable support member, and, in particular, to an internal locking device for telescopic tube sections.

BACKGROUND OF THE INVENTION

There are many forms of telescoping tube locking devices for apparatus like paint easels, telescopes, cameras, and other optical devices. Typically the locking devices use a clamp and bolting device, spring loaded pins and holes, wing nut operated clamps, threaded collar clamps, internal threaded studs, and resilient washers that require individual leg section rotation. Some of these devices do not allow adjustable extension of the legs. Others require external protrusions and parts that can fall off and become lost.

Accordingly, given the foregoing backgrounds relating to telescopic apparatus, it is one purpose of this invention to provide an internal locking device that sequentially unlocks multiple tube or leg sections by actuating a single push rod to retract the legs to a telescope close position. The legs are extended by pulling and do not require a release mechanism.

SUMMARY OF THE INVENTION

According to principles of the present invention in a preferred embodiment, this invention corrects the problems described above by providing a simple single push rod actuated locking device that will sequentially, from a proximal to a distal end, release the leg or tube locks between multiple tube sections. The spring-loaded push rod extends partially out from the proximal end of each telescopic tube. Consequently, there are no other protrusions at each tube section interface. The push rod activates the proximal tube lock clamping means and the remaining upper tube sections are released as each upper end of a tube section contacts an internal release mechanism. The locking device parts are similar in shape, but are smaller for each succeedingly smaller diameter tube section.

Other objects, advantages, and capabilities of the present invention will become more apparent as the description proceeds.

BRIEF DESCRIPTION OF THE DRAWINGS

FIG. 2 is an exploded perspective view of a first embodiment of the invention.

FIG. 3 is a perspective view of an alternate spring/lock for the first embodiment.

FIG. 4A is a side section view of the first embodiment.

FIG. 4B is a section view taken along lines 4B of FIG. 4A.

FIG. 9A is a partial section and front elevation of a preferred embodiment of the telescoping legs as used with a tripod for a camera mount or easel.

FIG. 9B is a partial section and side elevation view of the telescopic legs for the camera mount or easel.

FIG. 9C is a partial section view of the middle leg taken along lines 9C—9C of FIG. 9A.

FIG. 13 is an exploded perspective view of a second embodiment of the telescopic leg and clamping means.

FIG. 14 is an exploded perspective view of a preferred embodiment of the telescopic leg and clamping means.

FIG. 15 is a side section view taken along lines 15—15 of FIG. 13.

FIG. 16 is a side section view taken along line 16—16 of FIG. 14.

FIG. 17 is an enlarged section view from FIG. 16.

DETAILED DESCRIPTION OF THE INVENTION

Figure 1:
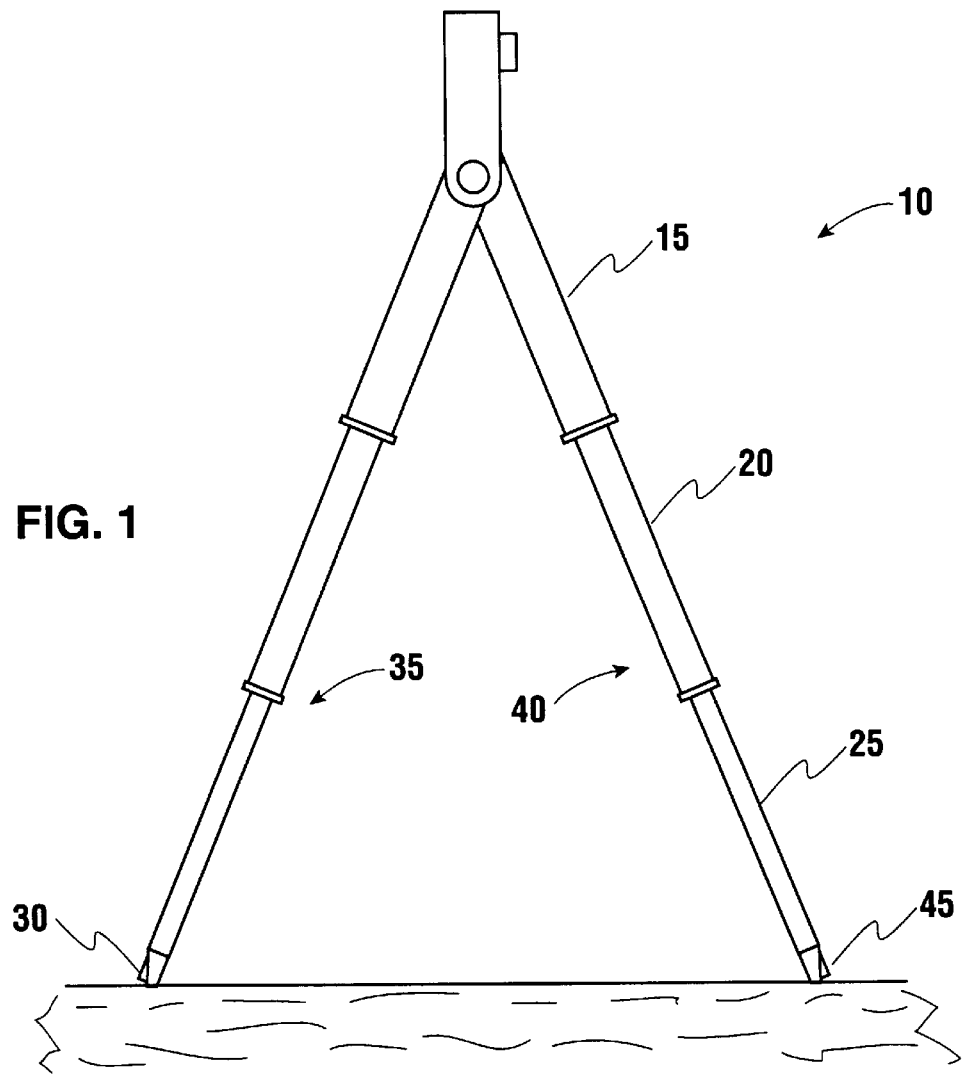
FIG. 1 illustrates a side elevation view of the present telescoping leg invention.

The inventive tube locking device will be described as it can be used in a tripod. A typical telescoping leg tripod 10 containing the inventive internal locking device is illustrated in FIG. 1. This tripod could be a platform for a camera, telescope, painter's easel or other device. This tripod, as shown, has three leg sections 15, 20, 25 but it could have more or less. One of the novel features of the invention is shown as the end of push rods 30 and 45 on front leg 35 and the back leg 40 respectively. The push rods are movable rods within the legs that release an internal locking element to telescope the legs to a closed position, as will be described below.

FIGS. 2 and 4 illustrate the first embodiment of the telescoping leg 35 elements. Within the foot 50 is push rod 30 that when pushed to the left (in FIGS. 2 and 4A) as at arrow 55, engages and moves release block 60. Pin 65 is captured within aperture 70 in plastic glide 75 after glide 75 is inserted up through leg aperture 80. Compression spring 85 within release block 60 restores the push rod 30 to its original position when the push rod is released. Plastic insert 87 eliminates metal-to-metal contact between leg sections 15, 20 and 25. FIG. 4A illustrates the assembled parts inserted within cut-away section 89 of leg section 25.

When the push rod 30 is not pushed as shown in FIG. 4A, the top 90 of pin 65 is forced against the inner wall of leg section 20 by the compression spring 85 in conjunction with any force that pushes on leg section 25, thereby locking the two sections in a fixed position. That position can be from the fully extended position, as in FIG. 1, or fully enclosed and any position in between. Pushing push rod 30 as at arrow 55 causes release block 60 to move to the left, disengaging top 90 of pin 65 from the inner wall 20 and the whole leg section 25 slides to the left until the end 95 of leg section 25 contacts and pushes the second release block 100, disengaging second pin 105 from the inner wall of top leg section 15. This view also shows a second spring 110 which is compressed between the inside face of release block 100 and a second plastic glide 115.

It can be seen that each leg section part is similar in shape and function, but is a larger size for each larger leg section, e.g., block 100 and pin 105 are larger than block 60 and pin 90. It is also obvious that pushing on push rod 30 sequentially releases each leg section.

FIG. 3 is a special embodiment for pin 65 and glide 75 utilizing a flat spring pin 120 which is inserted within a rectangular aperture 125 thereby acting as a bending spring to restore release block to the right (FIG. 4) when push rod 30 is released. This would eliminate the need for springs 85 and 110 and pin 65 in FIGS. 2 and 4A.

Figure 5:
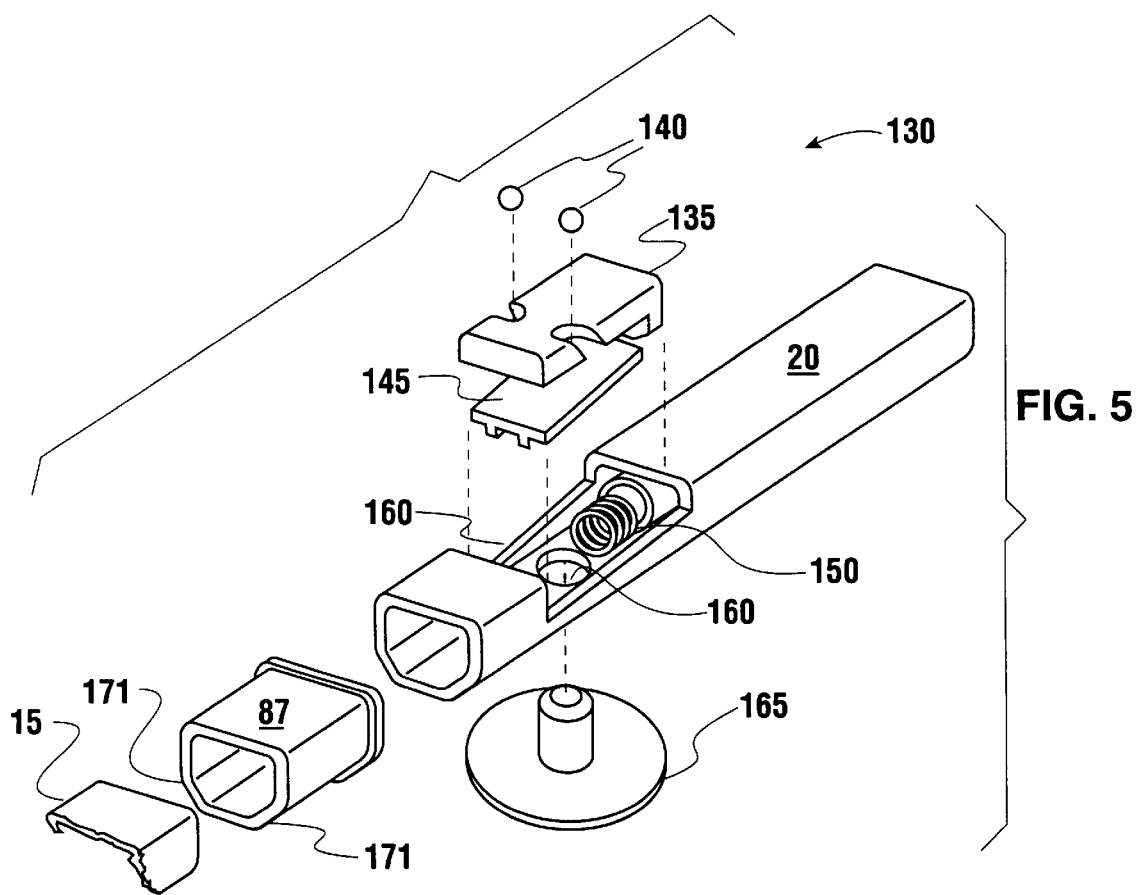
FIG. 5 is an exploded perspective view of a second embodiment of the present invention.
Figure 6:
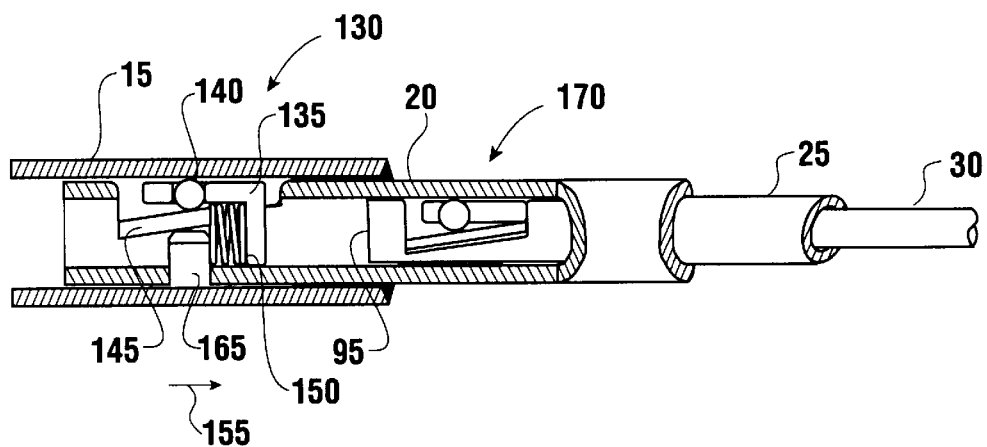
FIG. 6 is a side cut-away section view of the second embodiment.

FIGS. 5 and 6 illustrate a second embodiment using a ramp and ball type leg locking device 130. Exploded view of FIG. 5 shows an upper leg section 15 and a middle leg section 20 and plastic insert 87. The release block 135 is notched to accept two balls 140 which rest on ramp 145 as shown on FIG. 6. Spring 150 pushes the release block 135 to the right as to arrow 155 so that ball 140 is compressed between the inner surface of leg section 15 and inclined ramp 145 which, in turn, rests on the edges of the inclined cut edges 160 of leg section 20. In this condition, leg sections 15 and 20 are fixed. When leg section end 95 pushes against release block 135 compressing spring 150, the balls 140 are released from compression between leg section 15 and ramp 145 allowing leg section 20 to slide within leg section 15. In this embodiment, plastic glide 165 serves as a spring 150 stop and also acts as a bearing surface between the inner leg section 20 and outer leg section 15. A similar leg locking device 170 is partially illustrated between leg sections 20 and 25. The leg locking device 170 would be released as previously described by a push rod 30 within leg section 25. This is a preferred embodiment over the FIGS. 1–3 device since the end 90 of the pins 65 on FIGS. 1–3 can wear and not grip the leg section whereas the balls of this invention will wear evenly and always grip. FIGS. 2 and 4 show flat sides on each leg at 171 which add stiffness to the legs and could allow multiple legs to be closer together on a tripod in the folded position.

The pins 65 or 120 and the balls 140, in addition to locking the telescoping action, also force the leg 20 against the angled sides 171 (or other concave shape) thereby stabilizing angular displacement, i.e. keeping the leg sections parallel. The pins or balls can also be replaced by any other movable pivoting cam device, and the release blocks can have other configurations as well.

Figure 7:
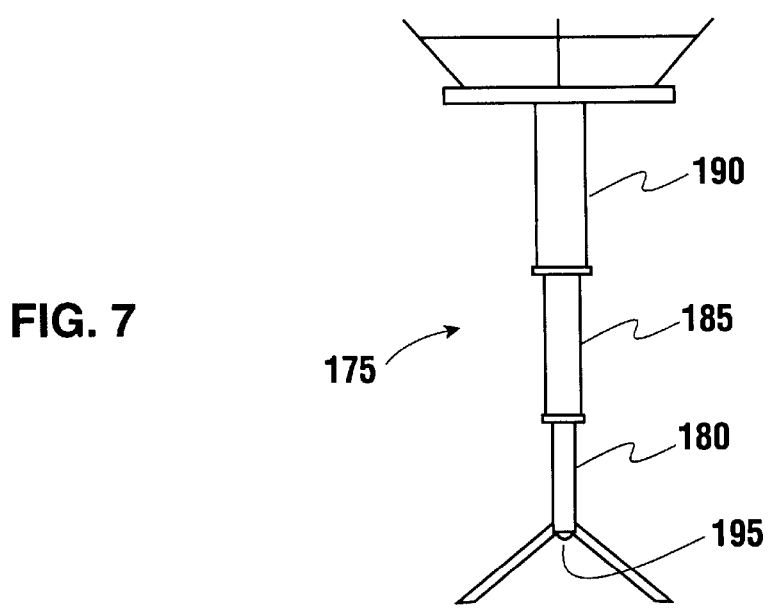
FIG. 7 is a front elevation of a telescoping music stand.

FIG. 7 illustrates another use for the telescopic tube, i.e., as a collapsible music stand 175 having three sections 180, 185 and 190 with push rod 195 at the bottom. This stand could also be inverted and have the push rod at the top.

Figure 8A:
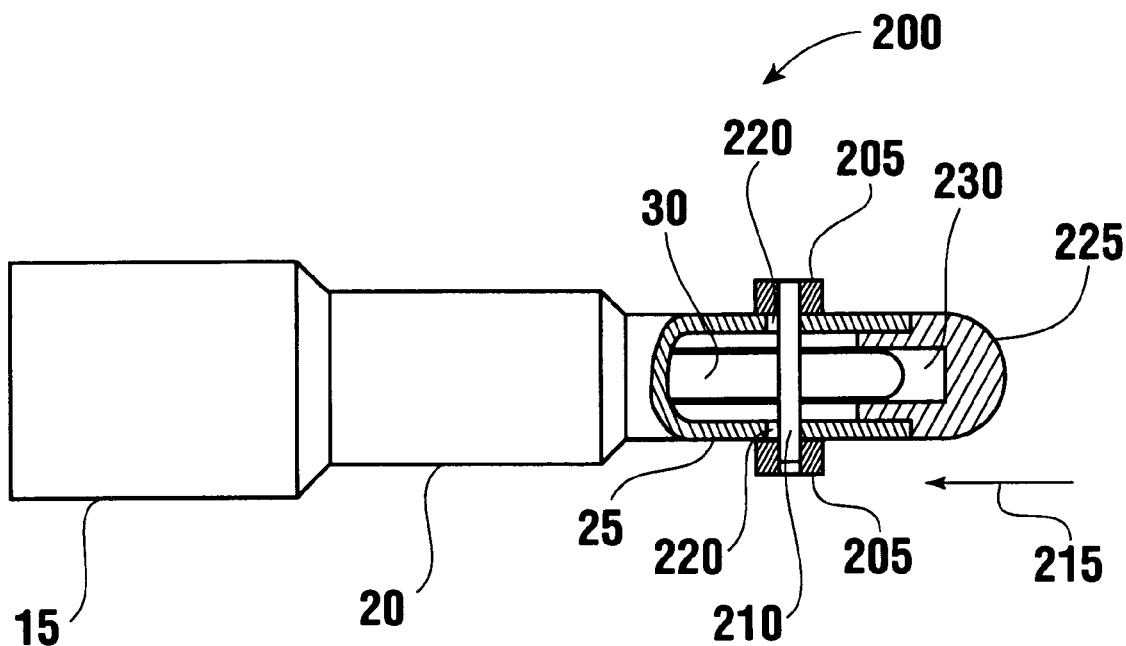
FIG. 8A is a partial section view of a preferred embodiment for the foot of the telescoping leg.
Figure 8B:
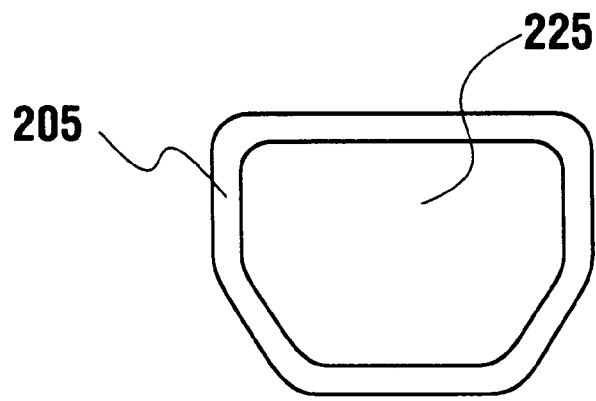
FIG. 8B is a bottom view of the preferred embodiment for the foot of the telescoping leg.

FIGS. 8A and B disclose an option to the push rod actuator 200 which in this case has a slidable release 205 which uses a pin 210 to connect to push rod 30. When release 205 is moved in direction 215, push rod 30 moves about ⅛" in the same direction since the pin 210 travels in short slot 220. End cap 225 supports push rod 30 within aperture 230. This release could be actuated with a person's toe, thereby eliminating the need to bend over to collapse the legs.

FIGS. 9A–C illustrate the use of the automatic telescopic legs connected to a tripod head 300 which can support either a painter's easel or a camera mount. FIG. 9A illustrates the two outer legs 305, 310 and center leg 315. The outer legs 305,310 are attached to leg ends 320,325 which in turn are pivotally attached to axle 330. Axle 330 also supports clamp 335. A support arm 340 is slidably attached to the clamp and can connect to an artist's easel or a camera mount.

Left leg 305 having two telescopic sections is shown in the open position and pushrod 345 and pushrod head 350 are in an upward position as shown by arrow 355. This is due to the compression spring 85 (FIG. 2) bearing against the bottom (not shown) of pushrod 345. The pushrod 345 is restrained by axle 330 and there is a small gap at 360. In this open position, the legs will lock as previously described and seen in FIGS. 2–6.

In contrast, right leg 310 is in the closed position and a leg 360 of pushrod head 365 contacts the axle 330 and forces pushrod 370 down as in arrow 375 and the leg locking devices are released and the legs can be retracted.

FIG. 9B illustrates the right leg 310 in the folded position where axle 330 engages the leg 360 of pushrod head 365.

FIG. 9C illustrates the middle leg 315 in cross section wherein this pushrod 380 is depressed by an eccentric portion 385 of clamp 335 bearing on pushrod head 390 when the middle leg is in the folded (closed) position and sliding support arm 340 is parallel to leg as shown. The middle leg telescopic sections can then be retracted within each other. The phantom lines of FIG. 9C illustrate the middle leg 315 in the open position. In this position, the pushrod 380 is moved up so that there is a gap 395 under pushrod head 390. The pushrod is forced up by spring 85 (FIG. 2) as shown by arrow 400, creating the gap 395 between pushrod head 390 and middle leg insert 405.

The push rod heads on each of the legs are accessible for manual operation when the tripod is in the open position by pushing with a finger.

Figure 10:
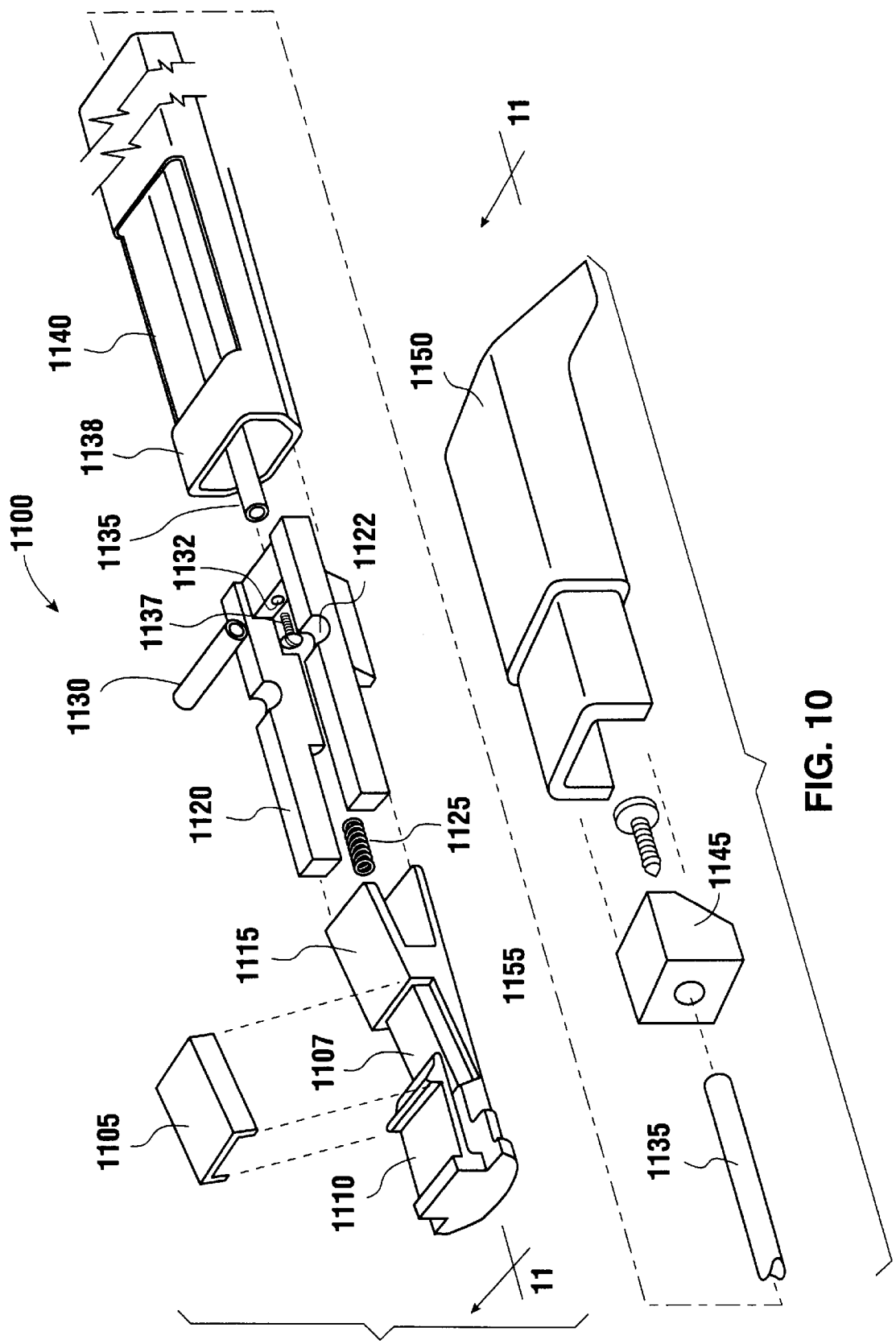
FIG. 10 is an exploded perspective view of an embodiment of the telescopic leg.
Figure 11:
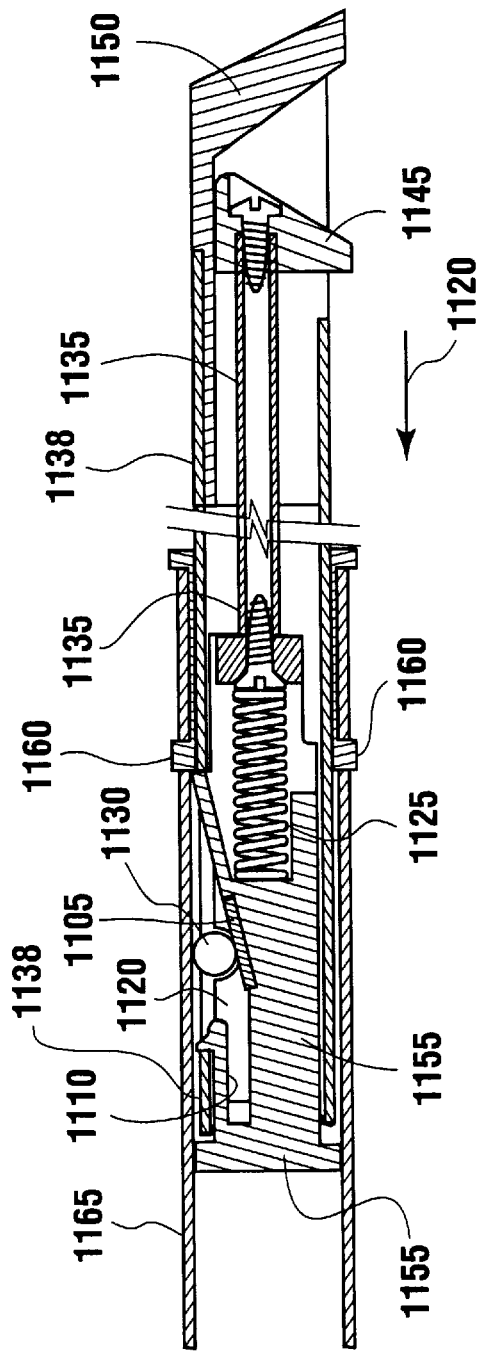
FIG. 11 is a side section view of the embodiment taken along lines 11—11 of FIG. 10.
Figure 12:
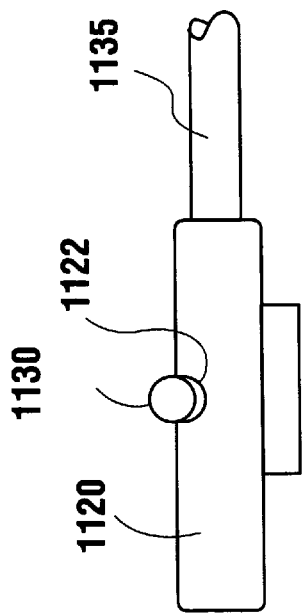
FIG. 12 is a side elevation of the release block of the embodiment of FIG. 10.

FIGS. 10, 11 and 12 illustrate a first embodiment of the telescopic leg. The components of the release apparatus 1100 consist of the following parts: metal ramp insert 1105 sets over ramp cutout 1107 on fixed ramp block 1155; release block 1120 has slot 1122 for pin 1130 and aperture 1132 for release rod 1135 which is retained by screw 1137; cantilever ramp section 1115 provides a friction for sliding against tube section 1138 and acts as a stop against plastic insert 1160 (FIG. 11) for the fully extended leg position; spring loaded cantilever latch section 1110 locks into leg tube 1138 at notch cutout 1140; and compression spring 1125 presses against ramp block 1155 to push release block 1120 away, forcing roller 1130 up ramp, thereby locking tube 1138 in extended position. Plastic insert 1160 reduces sliding friction, eliminates metal-to-metal contact and stops fully extended inner leg section.

FIG. 11 illustrates the push rod assembly consisting of the push-button 1145 and release rod 1135 which attach within a distal, or bottom portion of leg tube 1138 and outer leg tube 1165. By pushing button 1145 in direction shown by arrow 1120 the release block 1120 is moved in the same direction thereby disengaging roller 1130 from the inner surface of outer leg 1165. This permits inner leg 1138 to slide to the left until the button 1145 is released, at which time the leg is again locked in position. Release 1120 also pushes on next leg release block when button 1145 is pushed. If the button 1145 is not pushed, the next section remains locked even with this section fully retracted. Button 1145 can be toe-operated. The spring 1125 restores release rod 1135, release block 1120 and button 1145 to their original positions.

FIGS. 13 and 15 illustrate another embodiment of telescopic leg release assembly 1200. Release block 1205 has a slot 1207 that retains roller 1210. Release block 1205 is fixed by screw 1215 to release rod 1220. Release block 1205 sets over ramp block 1222 and rests on flats 1240 and 1245. Compression spring 1260 pushes release block 1205 to right forcing pin 1210 up ramp so it locks against outer leg 1275. The outer leg 1275 surrounds leg 1270 (FIG. 15). Metal-to-metal contact of leg sections is eliminated and outer leg friction is reduced by optional upper plastic glide 1225 and lower plastic glide 1250.

FIGS. 14 and 16 illustrate the preferred embodiment which is similar to FIGS. 13 and 15 except there is a cutout 1230 in a proximal or upper portion of inner leg 1280 that contains ramp block 1222. There is also a bottom glide 1281 and a bottom aperture 1285 in leg 1280. The ramp block 1222 has a raised section 1282 that engages a slot 1283 when located within tube 1280. Raised section 1282 also acts as a stop when leg is fully extended. Optional glide 1225, if used, also acts as a stop. Tabs on the bottom of ramp block 1222 engage the sides of a square or rectangular hole 1285 to keep ramp block 1222 from moving side to side and binding the release block 1205 that straddles the ramp block 1222.

An advantage of the tube sections 1280 and 1275, having angled sides or concave internal surfaces, is that these angled surfaces lock the legs together when the roller 1210 engages the outer tube section. Ramp 1222 and the inner tube 1280 is forced down into the angled side of the outer tube 1275 (FIG. 16).

It should be noted that springs 1260 (FIGS. 13, 15 and 16) are not needed if the smaller diameter leg sections 1270 and 1280 are in the bottom of the tripod, i.e. gravity locks the release block 1205 and roller 1230 to the leg section 1275.

FIG. 17 shows the details of the tabs 1284 within the rectangular hole 1286.

FIGS. 13 and 14 operate in the same manner as FIGS. 10–12 but the release block and ramp lock are configured differently as is the plastic glide.

The advantages of having the automatic leg releases at the top are that they are easier to reach than at the bottom as in FIGS. 2–6 and the bottom leg sections can be sealed to prevent dirt and water from entering the legs.

While the present invention has been described by reference to specific embodiments, it will be apparent that other alternative embodiments and methods of implementation or modification may be employed without departing from the true spirit and scope of the invention.

What is claimed is:

1. A telescopic tube locking device for multiple-section telescopic tubes, the telescopic tube locking device comprising:
   (a) a first tube section having a push rod assembly slidably affixed within the first tube section;
   (b) a second tube section slidably assembled over the first tube section;
   (c) a spring-loaded first clamping means within the first tube section further comprising:
      (i) a movable release block within the first tube section affixed to the push rod;
      (ii) a roller pin straddling the release block; and
      (iii) a ramp block supporting the roller wherein pushing the push rod releases the clamping means thereby permitting the first tube section to slide within the second tube section;
   (d) additional tube sections slidably assembled over the second tube section; and
   (e) additional clamping means within the additional tube sections wherein tube section sequential release occurs starting with the first tube section only when the push rod is pushed.

2. The clamping means of claim 1 wherein spring loading is provided to the clamping means by a compression spring between the ramp block and the release block.

3. The telescopic tube locking device of claim 1 wherein the clamping means further comprises a plastic glide affixing the ramp block to the first tube section; thereby providing low friction contact between the first and second tube sections.

4. The telescopic tube locking device of claim 1 wherein the tube sections are legs of a tripod.

5. The telescopic tube locking device of claim 1 wherein the tube sections are a vertical section of a stand supporting apparatus selected from the group consisting of music stands, paint easels, telescopes, cameras and other optical devices.

6. A multiple-section telescopic tube locking device comprising:
   (a) a first tube section having a pair of angled surfaces;
   (b) a second tube section having a pair of angled surfaces, slidably assembled within the first tube section, the second tube section having a proximal portion and a distal portion;
   (c) a third tube section having a pair of angled surfaces, slidably assembled within the second tube section, the third tube section having a proximal portion;
   (d) a push rod slidably affixed within the third tube section;
   (e) a first spring-loaded clamping means within the proximal portion of the third tube section, the clamping means further comprising:
      (i) a movable release block within the first tube section affixed to the push rod;
      (ii) a roller pin straddling the release block;
      (iii) a ramp block supporting the release block; and
   (f) a second spring-loaded clamping means within the proximal portion of the second tube section; wherein pushing the push rod releases the first clamping means, thereby permitting the third tube section to slide within the second tube section, said second tube section in turn pushing on the second clamping means, thereby permitting the second tube section to slide within the first tube section.

7. The telescopic tube locking device of claim 6 wherein spring loading is provided to each clamping means by a compression spring between the ramp block and the release block.

8. The telescopic tube locking device of claim 6 wherein a raised section on each ramp block is restrained by a slot within the third and second tube sections.

9. The telescopic tube locking device of claim 6 wherein the tube sections are legs of a tripod.

10. A telescopic tube locking device for multiple-section telescopic tubes, the telescopic tube locking device comprising:
   (a) a first tube section having a push rod assembly slidably affixed within the first tube section;
   (b) a second tube section slidably assembled over the first tube section;
   (c) a spring-loaded first clamping means within the first tube section further comprising:
      (i) an L-shaped release block slidably retained within the first tube section;
      (ii) a pair of balls restrained by slots in the L-shaped release block; and
      (iii) a tilted ramp affixed below a cut-out section of the first tube wherein the balls contact an inner surface of the first tube section and an upper portion of the tilted ramp, thereby locking the first and second tube sections together; and
   wherein pushing the push rod releases the clamping means thereby permitting the first tube section to slide within the second tube section.

11. The telescopic tube locking device of claim 10 wherein spring loading is provided to the clamping means by a compression spring between a fixed plastic guide and the L-shaped release block.

12. The telescopic tube locking device of claim 10 wherein the tube sections are legs of a tripod.

* * * * *